United States Patent [19]

Lakosky

[11] Patent Number: 5,598,065
[45] Date of Patent: Jan. 28, 1997

[54] LIGHTING SYSTEM FOR SNOWMOBILES AND THE LIKE

[76] Inventor: Allen J. Lakosky, 312-2nd Ave. North, Virginia, Minn. 55792

[21] Appl. No.: 187,400

[22] Filed: Jan. 25, 1994

[51] Int. Cl.⁶ .................................................... B60Q 1/26
[52] U.S. Cl. .............................................. 315/77; 315/82
[58] Field of Search .................................. 315/75, 76, 77, 315/82, 200 A; 362/72, 106, 226, 369; 340/65, 84

[56] References Cited

U.S. PATENT DOCUMENTS

| 3,691,526 | 9/1972 | Huntington . |
| 3,757,108 | 9/1973 | Burland ............................. 240/46.59 |
| 3,822,943 | 7/1974 | Mason . |
| 4,195,328 | 3/1980 | Harris, Jr. ................................ 362/72 |
| 4,198,027 | 4/1980 | Urbanck ................................. 362/369 |
| 4,348,613 | 9/1982 | Hormel et al. ............................ 315/77 |
| 4,471,350 | 9/1984 | Chow . |
| 4,593,855 | 6/1986 | Forsyth . |
| 4,598,339 | 7/1986 | Ainsworth . |
| 4,958,143 | 9/1990 | Knauff . |
| 5,001,402 | 3/1991 | Milton et al. . |

OTHER PUBLICATIONS

U.S. Trademark Reg. No. 1,831,246 for the mark KOOL-GLO.

Primary Examiner—Frank Gonzalez
Assistant Examiner—Reginald A. Ratliff
Attorney, Agent, or Firm—Dorsey & Whitney

[57] ABSTRACT

The present invention provides a lighting system for vehicles, particularly snowmobiles, in an uncomplicated kit form which may be mounted quickly and easily. The lighting system includes two gas discharge lamps charged with an inert gas, i.e., "neon lamps," and electrical components and wiring for operably coupling the lamps to a lower source associated with the vehicle. In an alternative embodiment of the present invention, the lighting system includes an alternating flasher whereby the lamps light alternatively at a selected time interval. Either embodiment of the lighting system may be powered directly by the battery of the vehicle or may include a rectifier whereby the system can be powered directly from the engine or through a voltage regulator.

11 Claims, 8 Drawing Sheets

LIGHTING SYSTEM FOR SNOWMOBILES AND THE LIKE

TECHNICAL FIELD

The present invention relates to lighting systems for vehicles. In particular, it relates to a lighting system including at least one tubular discharge lamp charged with an inert gas for use with vehicles, including off-road vehicles such as snowmobiles and the like.

BACKGROUND OF THE INVENTION

Off-road vehicles, including such vehicles as sport utility trucks, all terrain vehicles (ATVs), dirt bikes and snowmobiles, are vehicles specifically designed to include features such as special tires, four-wheel drive, tracks or skis to permit their operation and facilitate transportation away from paved highway or road surfaces. In addition to their utilitarian aspects, in recent years such vehicles have experienced a surge in popularity with persons using them for largely recreational purposes. People use them to transport camping, fishing and hunting equipment into remote areas, and enjoy them because they provide the exhilaration associated with exploration and high speed, and the challenge of handling a vehicle on an unimproved surface.

One the aforementioned vehicles, the snowmobile, is basically a self-powered, motorized sled having a chassis, two steerable front skis and an engine-driven, snow-contacting track in the rear. In certain areas of the United States, e.g., the New England states, Mountain states, and, particularly, in the upper Midwest, snowmobiles have become extremely popular. Thirty years ago, there were few of these machines and those that were available were quite slow and primitive. With the surge in interest and popularity, the machines have become quite sophisticated and very fast, attracting even more interest. Snowmobiles are owned, rented and used in the thousands and a well-defined off-road trail system, complete with traffic control signs, has been developed.

With the growth and popularity of snowmobiles come attendant problems. The use of the snowmobile by persons unaccustomed to following trails in rural or remote areas results in people becoming lost. Less than skilled operators, the increased traffic on trail systems and the high speeds attainable by modern snowmobiles, which may be in excess of 100 miles per hour, pose dangers, and the frequency and severity of accidents involving one or more snowmobiles has increased. The increased use of such vehicles has also put pressure on game reserves and wilderness areas because such areas can be accessed or explored easily during the winter months.

Departments of natural resources, law enforcement officials and emergency services, such as ambulance services, have an interest in acquiring and using off-road vehicles to provide regular patrols, policing functions and emergency and rescue services. The off-road vehicles, including snowmobiles, used by these officials typically have been vehicles commercially available to the public at large, which are then adapted to signal that they are official vehicles and to perform desired functions. It would be advantageous if commercially available off-road vehicles, including snowmobiles, could be provided with a lighting system that sets them apart from the machines used by the public, as well as signals to the public or to a specific individual that the vehicle is an official vehicle which may be on a particular mission.

SUMMARY OF THE INVENTION

The lighting system of the present invention is directed to and in large part solves the aforementioned problems and facilitates and enhances the safe enjoyment of off-road vehicles, including snowmobiles.

An object of the present invention is to provide a lighting system for off-road vehicles, particularly snowmobiles, used by public officials to facilitate the safe and controlled use of such vehicles by the public.

Another object of the present invention is to provide a lighting system that may be mounted on any vehicle, particularly commercially available off-road vehicles and, even more particularly, snowmobiles, without requiring significant modification of the vehicle, wherein the lighting system enhances the appearance of the vehicle and user's enjoyment of the vehicle.

The present invention provides a lighting system for snowmobiles, and other vehicles, in a complete, uncomplicated kit form which may be mounted quickly and easily. The lighting system includes at least one gas discharge lamp charged with an inert gas and means for operably coupling the lamp to a power source associated with the snowmobile, including a wiring harness, transformer, optional rectifier and an off/on control switch. In an alternative embodiment of the present invention, the lighting system includes at least two discharge lamps, with a transformer for each. Yet another embodiment includes two lamps, the electrical components required for the two lamps, and an alternating flasher whereby the discharge Imps light alternatively at a selected time interval. Any embodiment of the lighting system of the present invention may be powered directly by the battery of the snowmobile or may include the rectifier whereby the system can be powered directly from the engine wiring or through a voltage regulator.

An advantage of the lighting system of the present invention is associated with the use of inert gas discharge Imps, i.e., "neon" lamps in the system. The value of such lamps as markers or signal devices is well known, as reflected and disclosed in U.S. Pat. No. 5,001,402 (Milton et al.), directed to providing illuminated aerial markers incorporating neon lamps to provide highly effective and brilliant illumination. The fog, dust and precipitation penetrating qualifies of neon light make neon lamps well-suited for use as markers or signals. Such lamps are constructed to generate a discharge glow between electrodes within or associated with a glass tube charged or filled with an inert gas. To produce electroluminescence, high frequency and voltage AC power is provided to the electrodes to drive the gas filling the tube.

In the system of the present invention, a transformer is connected to the tubular discharge lamps. The transformer requires a 12 V direct current input. At the output, the transformer supplies 1,500 V alternating current and a 20 mA current. Thus, although highly effective neon light is provided, only low power is drawn from the vehicle, making the system ideally suited for use with snowmobiles or other relatively small off-road vehicles.

Another object of the present invention is to provide a lighting system which may be mounted removably on off-road vehicles, particularly snowmobiles, whereby it may be transferred conveniently and easily from one vehicle to another without substantial modification or re-design of the vehicles.

A feature of the present invention is a protective housing for the generally tubular discharge lamp or lamps, whereby the relatively delicate tubular lamps are protected from debris and surface material kicked up by the vehicle on which the lighting system is mounted. A specific feature of the protective means for protecting the lamps of the lighting system is at least one vibration isolating mounting arrangement associated with each lamp.

The protective and vibration isolating feature of the present invention comprises a "tube-within-a-tube" design wherein the elongated generally tubular discharge lamp is housed within a clear outer clear tube and wherein the vibration isolating means comprises an annular body or ring of high density foam material at each end of the co-axial tubes between the concentric inner discharge lamp tube and the outer protective tube. Thus, a significant advantage of the present invention is that it may be used with off-road vehicles, such as snowmobiles, wherein the drive mechanism kicks up a significant amount of particulate material and wherein the surface conditions and nature of the vehicle create substantial vibration.

The present invention improves the operating safety and visibility of off-road vehicles, while enhancing the aesthetic enjoyment of using such vehicles. The present invention is available in kit form, is adaptable to be used with any off-road vehicle, particularly any snowmobile, and may be installed without the using specialized equipment and without substantial redesign of the vehicle with which it is being used.

Other objects and advantages of the present invention will become more fully apparent and understood with reference to the following specification and to the appended drawings and claims.

DETAILED DESCRIPTION OF THE PREFERRED EMBODIMENT

Figure 1:
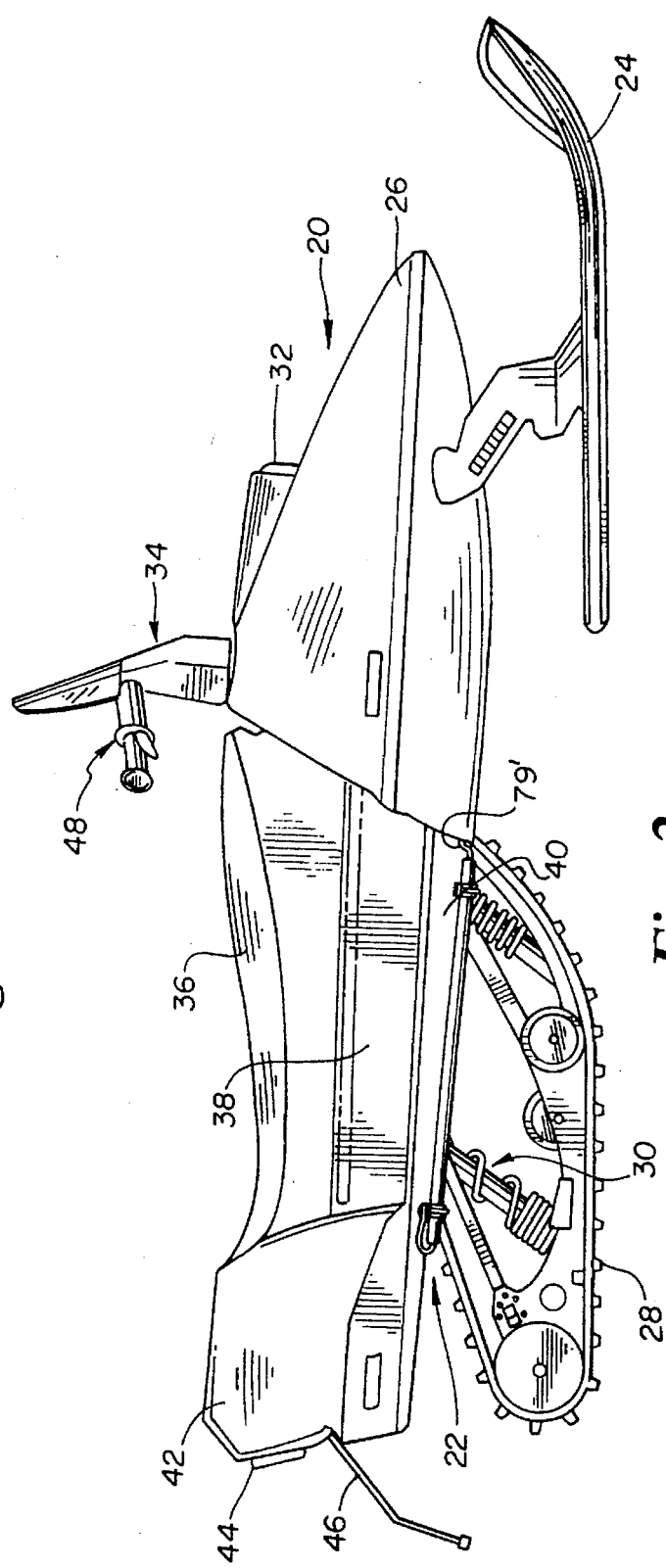
FIG. 1 is a side elevational view of a typical snowmobile with one embodiment of the present invention mounted thereon.
Figure 10:
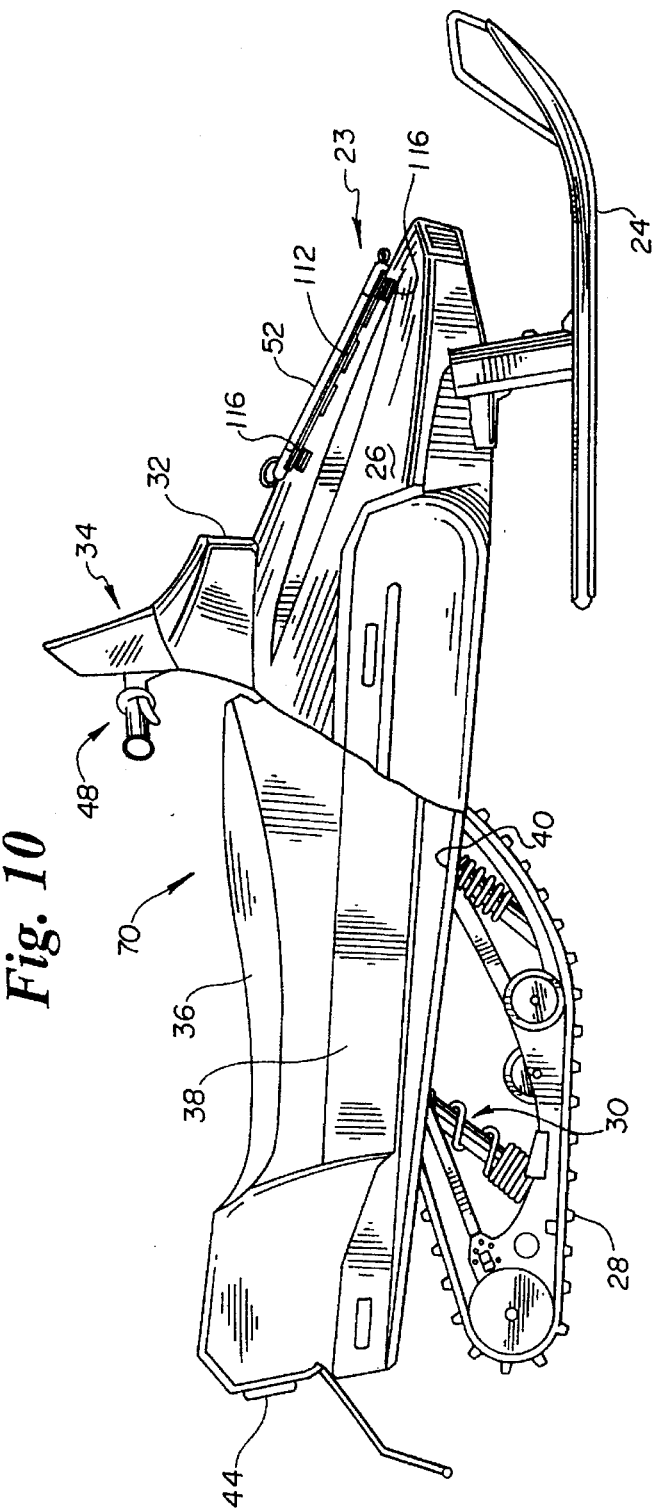
FIG. 10 is a side elevational view of a typical snowmobile with an alternative embodiment of the present invention mounted on the front end thereof.

FIGS. 1 and 10 depict a snowmobile 20, one of the vehicles with which the lighting system 22 of the present invention might be used. The depicted snowmobile 20 is intended to be representative of commercially available snowmobiles and of off-road vehicles generally. It includes a pair of substantially identical front skis 24, a hood cowl 26, drive track 28 and associated drive track suspension indicated generally at 30. The cowl 26 houses a typical two or four stroke internal combustion engine, although any suitable power source may be used. A headlight 32 is carried on the cowl 26, as is a windscreen and windshield, indicated generally at 34. To the rear of the cowl 26, an occupant seat 36 is mounted on the chassis 38 of the snowmobile 20. On each side of the chassis 38 are running boards 40 for receiving the feet of the rider(s). At the end of the elongated seating seat 36, there is usually a luggage or cargo compartment 42 carrying a tail light or stop light 44 and a snow/debris wake deflector 46. A handlebar-type steering, throttle and/or brake assembly 48 is provided to control the snowmobile 20.

Figure 6:
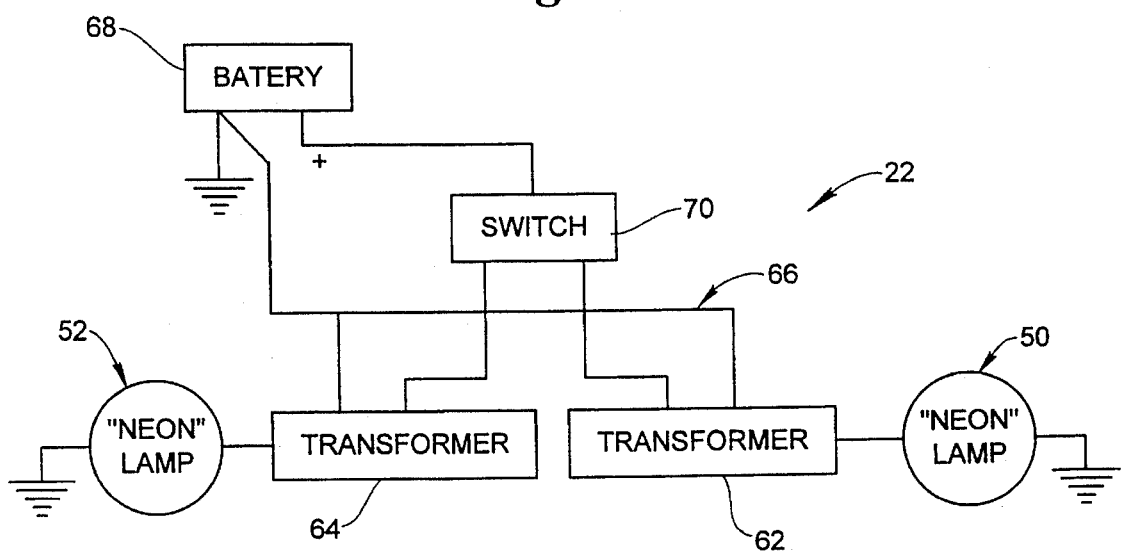
FIG. 6 is a circuit diagram of the present invention.
Figure 7:
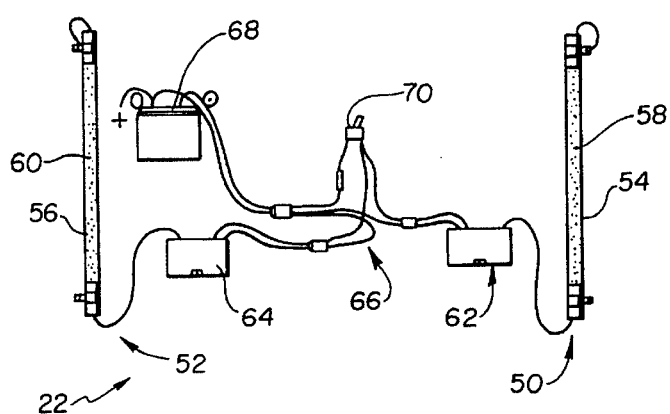
FIG. 7 depicts the circuit according to FIG. 6 embodied in electronic component form, including the neon lamps and tubular protectors of the present invention.

Referring to FIGS. 6–9, a first embodiment of the lighting system of the present invention is depicted. Referring particularly to FIG. 7, the lighting system 22 of the present invention includes two cylindrical, elongated light elements 50, 52. Each light element 50, 52 comprises an outer protecting tube 54, 56 and an inner discharge lamp tube 58, 60, concentric and coaxial with respect to the outer protective tube 54, 56 (further described below with reference to FIG. 3). Each discharge lamp tube 58, 60 is preferably formed from glass and has a diameter ranging from about 2 millimeters to about 10 millimeters. The glass lamp tubes 58, 60 may be made of glass such as transparent soda glass or a borosilicate glass and are charged or pumped with an inert gas such gas as argon, neon, krypton or xenon under a pressure from several mmHg to several hundred mmHg. Although the depicted light elements 50, 52 are generally straight, having a straight central longitudinal axis, either straight or curved shapes may be used and the diameter and length may be varied in response to design criteria, such as the vehicle on which the lighting system 22 is to be mounted.

With continued reference to FIG. 7, the lighting system 22 of the present invention includes the pair of light elements, 50, 52, each of which has an associated, respective transformer, 62, 64. Each transformer 62, 64 has an input consisting of a bipolar transistor and switching circuitry (not shown). As usual in such transformers (a wide variety of which are commercially available for selected purposes), the switching circuitry consists of a capacitor, resistor, zener diode and feedback winding, in the present invention adapted to oscillate the output windings at 20,000 hertz to obtain the desired output voltage. With continued reference to FIG. 7, the present invention includes a wiring harness 66 for operably coupling or connecting the lighting system 22 to a battery 68. An off/on toggle switch 70 is operably connected to the wiring harness 66 to allow the user to control the lighting system 22. The switch 70 is rated for 10 amperes of current for 25 volts alternating current and 15 amps of current for 125 volts of alternating current and for 3.4 horsepower at 250 volts of alternating current. Such switches are commercially available as single-pull, single-throw toggle switches, for example switch model number 9330, made by Levitron.

FIG. 6 is a simplified, block circuit diagram depicting the lighting system 22 of the present invention, and is commonly numbered with FIG. 7.

Figure 8:
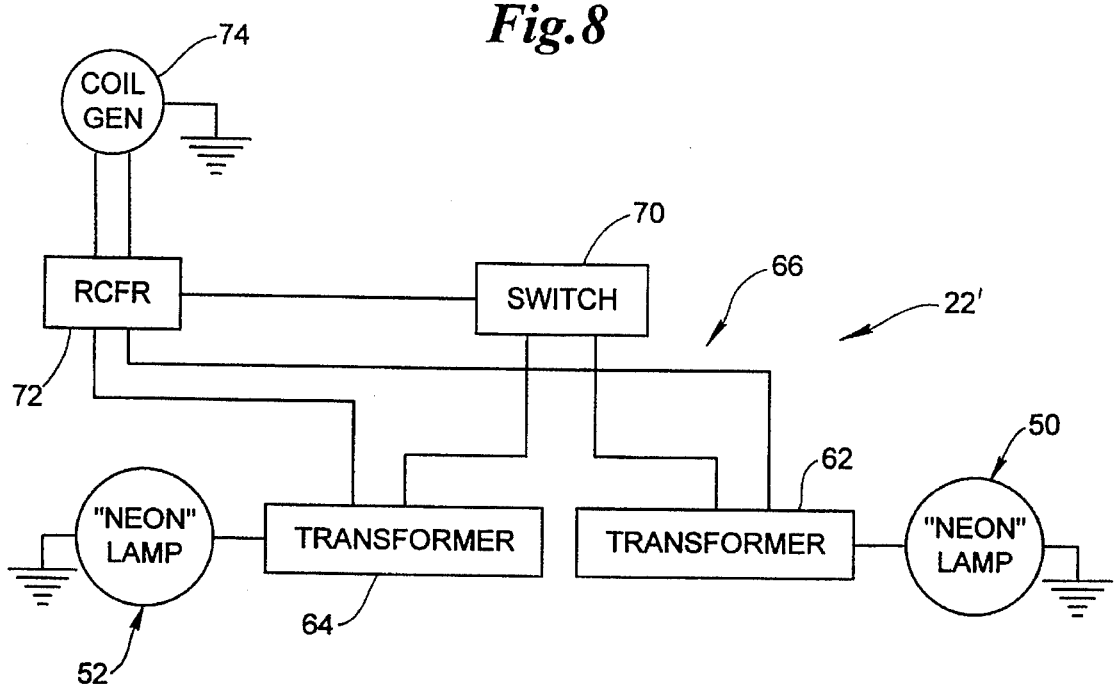
FIG. 8 is a circuit diagram of a modified form of the present invention.
Figure 9:
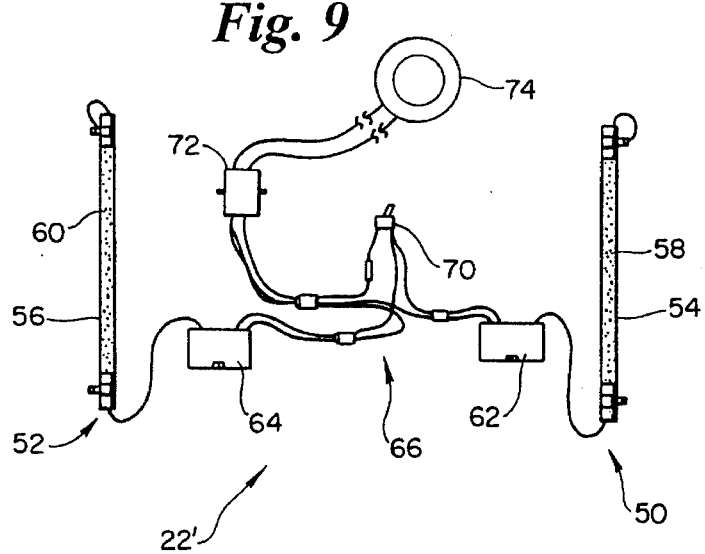
FIG. 9 depicts the circuit according to FIG. 8 embodied in electric component form, including the neon lamps and their tubular protectors.

FIGS. 8 and 9 depict an alternative embodiment of the lighting system of the present invention which is substantially similar to the embodiment 22 depicted in FIGS. 6 and 7. Therefore, the embodiment depicted in FIGS. 8 and 9 is denoted generally at 22' and common components of the system 22' are commonly numbered with the embodiment of FIGS. 6 and 7. The lighting system 22' includes a relay rectifier pod 72 whereby the lighting system 22' may be used with a vehicle that does not have a battery. The inputs for the relay rectifier pod 72 may be coupled to a 12-volt AC power source, i.e., the wiring harness coming out of the engine of the vehicle, or to a typical, commercially available 12-volt AC voltage regulator as indicated in FIG. 9 at 74.

Figure 3:
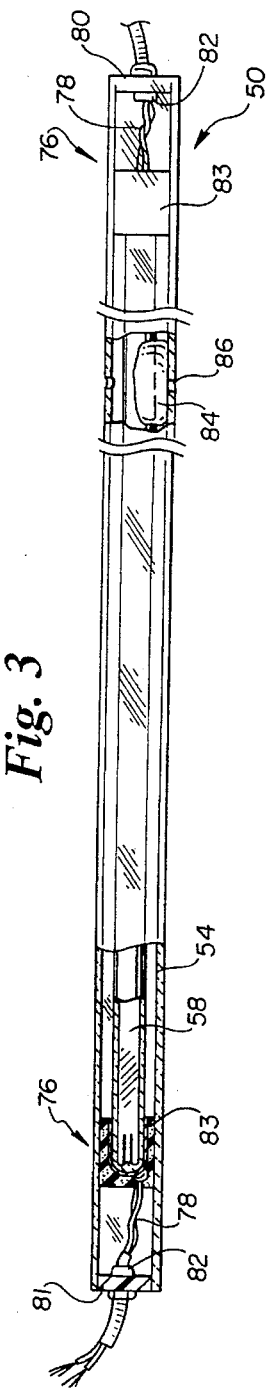
FIG. 3 is a side elevational view of the elongated, generally tubular neon lamp tube and tube protector of the present invention.

Referring to FIG. 3, one of the light elements 50 of the present invention is depicted. Each light element 50, 52 of the present invention is substantially identical, so only one is described. The light element 50 is an elongated, generally tubular cylinder and includes an outer clear protective housing tube 54 and an inner glass discharge lamp 58. The outer tube 54 and the lamp 58 are coaxial and concentric. The lamp 58 may be formed from 10 millimeter "Voltarc" glass, manufactured by Voltarc Tubes, Inc., Fairfield, Conn., available through any neon glass design shop or neon dealer, and is pumped or charged with an inert gas, neon or argon being preferred for providing a orange-red light or a blue light, respectively. Each end of the lamp 58 is substantially the same, including a typical electrode arrangement 76 with a pair of wire connectors 78 extending therefrom.

The housing tube 54 is preferably formed by a clear Lexan® material (a General Electric product) having a ⅛ inch thick wall. The outside diameter of the Lexan® tube is approximately ⅞ of an inch. Each end of the housing tube 54 is sealed closed by a friction fit plastic cap button 80, 81 having a small aperture through which the wires 78 pass. A wire knot or suitable stop 82 is provided to make sure the wires 78 are held in place with respect to the electrode 76.

With continued reference to FIG. 3, each light element 50 includes at least two vibration isolators 83, one adjacent to or at each end of the element 50. The ring-shaped isolators 83 ideally are formed from a suitable high density, dosed cell foam which encircles the inner discharge lamp tube 58 and fills the space between the inner and outer tubes 58, 54. After the annular isolators 83 are placed around the inner lamp tube 58, the tube 58 and the isolators 83 are inserted into the outer protective tube 54. FIG. 3 also depicts a supplementary vibration isolator 84 for use with longer versions of the light elements 50, 52. In this instance, an aperture 86 is provided at a selected point along the length of the light element 50, 52, for example in the middle, and a suitable foam material is pumped into the space between the lamp tube 58 and the outer protective tube 54, thereby making sure the lamp tube 58 is held without substantial flexing or vibration generally centrally within the outer tube 54.

Figure 2:
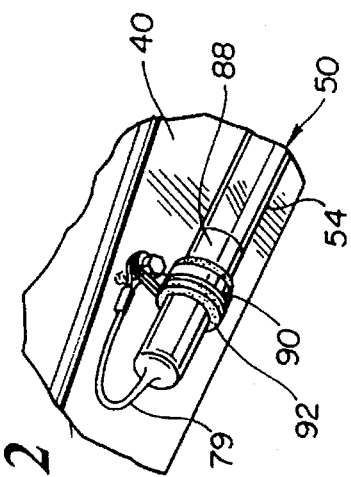
FIG. 2 is a fragmentary perspective view depicting the mounting and grounding of the present invention relative to the vehicle on which it is mounted.

Referring to FIGS. 1 and 2, the end of each light element 50, 52 may be coated or sealed with appropriate sealing or potting material 88 such as "Plastidip", manufactured by PDI, Inc., Blaine, Minn. The light elements 50, 52 are preferably mounted bilaterally along the underside surface of the running boards 40 of the snowmobile 20. A suitable ring clamp 90 may be used at each end of the light elements 50, 52, and an additional vibration isolating packing material, in the form of an annular grommet or washer 92 may be used between the ring clamp 90 and the protective housing tube 54, 56 of each light element 50, 52. A ground wire 79, one of the wires 78, may be coupled suitably to the underside of the running board 40. As suggested in FIG. 1, at the opposite end of the light elements 50, 52, the positive wire 79' is coupled into the wiring harness 66, suitably installed underneath the hood cowl 26.

Figure 4:
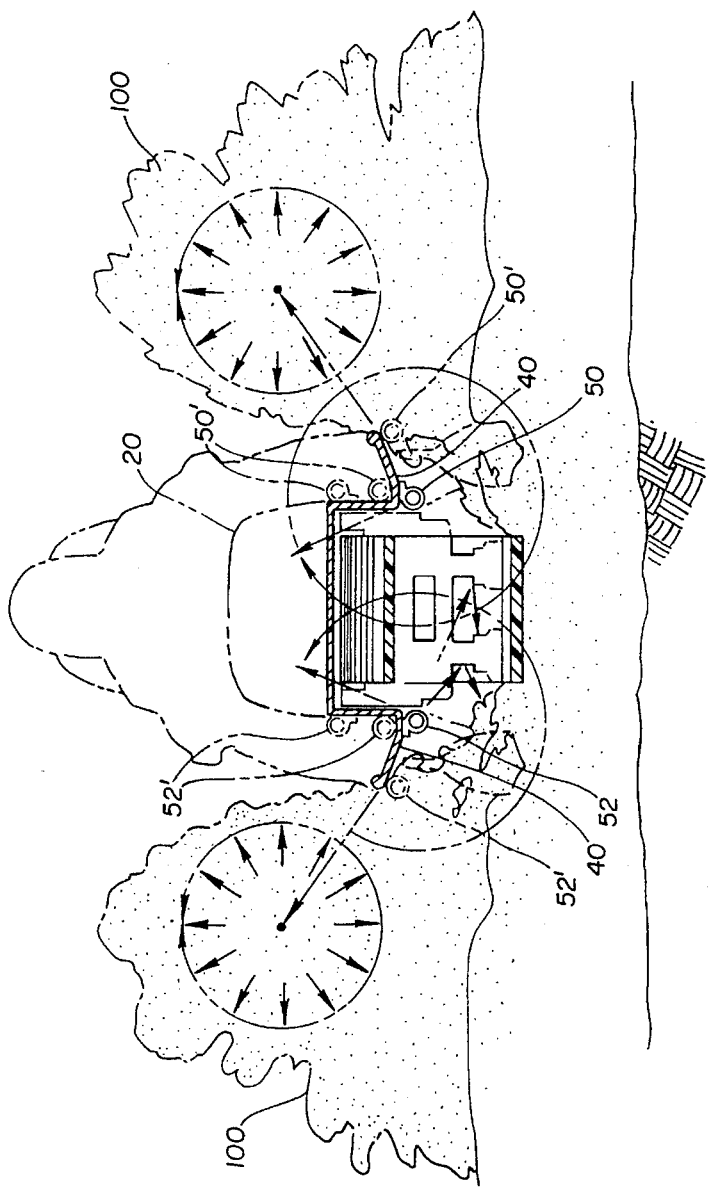
FIG. 4 is a rear elevational view depicting a moving snowmobile upon which the present invention is mounted, and schematically depicts the illuminating effect of the present invention.
Figure 5:
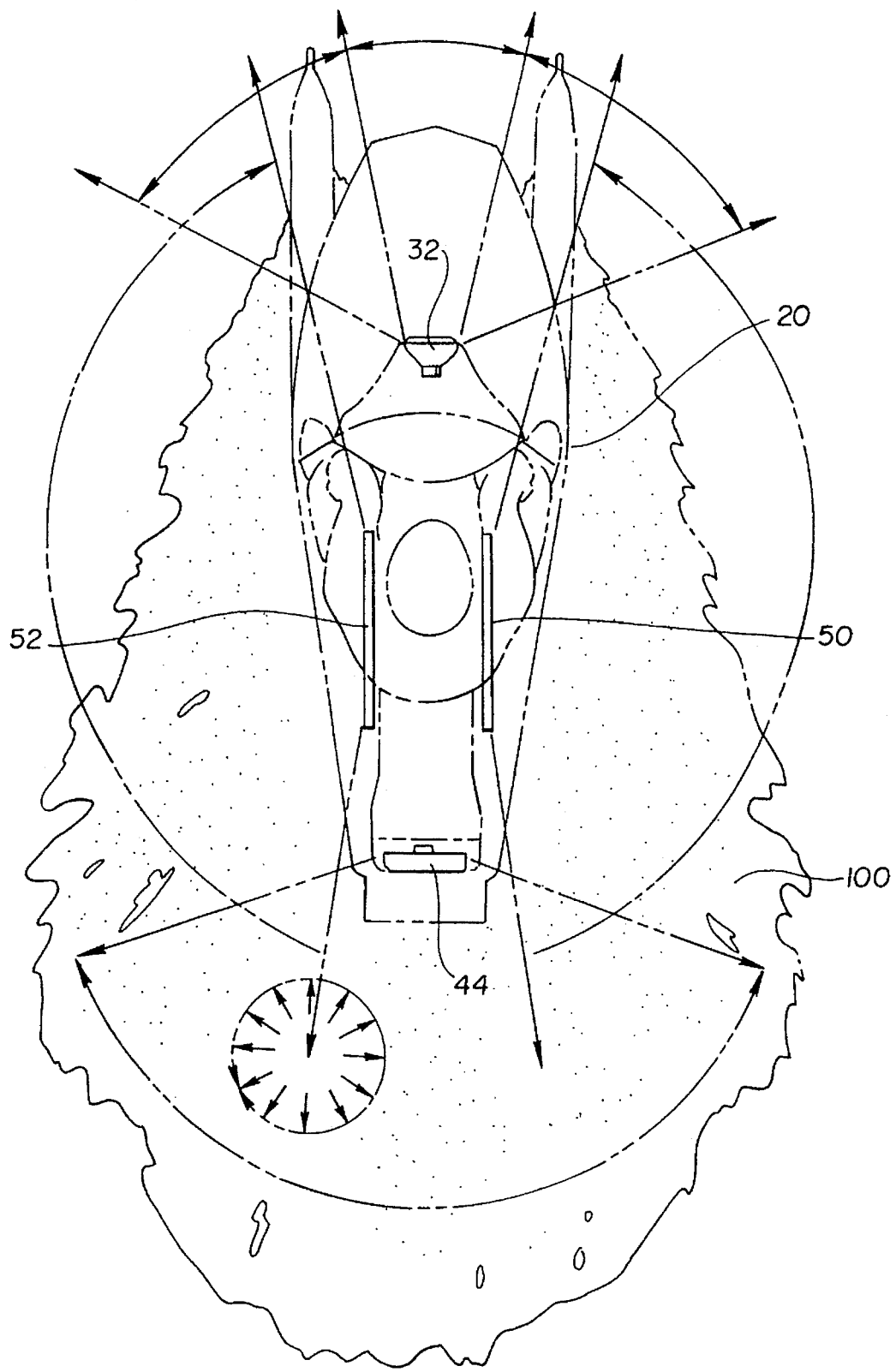
FIG. 5 is a top plan view depicting a snowmobile in motion with the present invention mounted thereon, and schematically depicts the illuminating effect of the present invention.

FIGS. 4 and 5 are schematic representations of the pool of illumination provided by the lighting system 22 of the present invention. As the snowmobile 20 travels over the snow or ice surface, the light produced by the lighting elements 50, 52 mounted under the running boards 40 is cast light primarily laterally, but also to some degree upwardly, to illuminate the plume or wake of snow 100 raised by the passage of the snowmobile 20 in a glowing mist of colored, diffuse light. FIG. 5 shows the relative illumination cast by a lighting system 22 of the present invention with respect to the illumination provided by the snowmobile headlight 32 and tail light 44. It will be appreciated that lateral visibility is substantially enhanced by this embodiment of the present invention.

Figure 11:
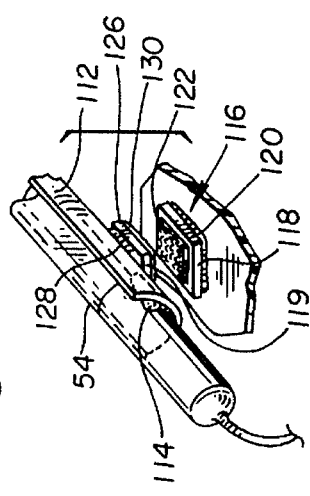
FIG. 11 is a fragmentary detail showing the mounting of the modified form of the present invention.
Figure 12:
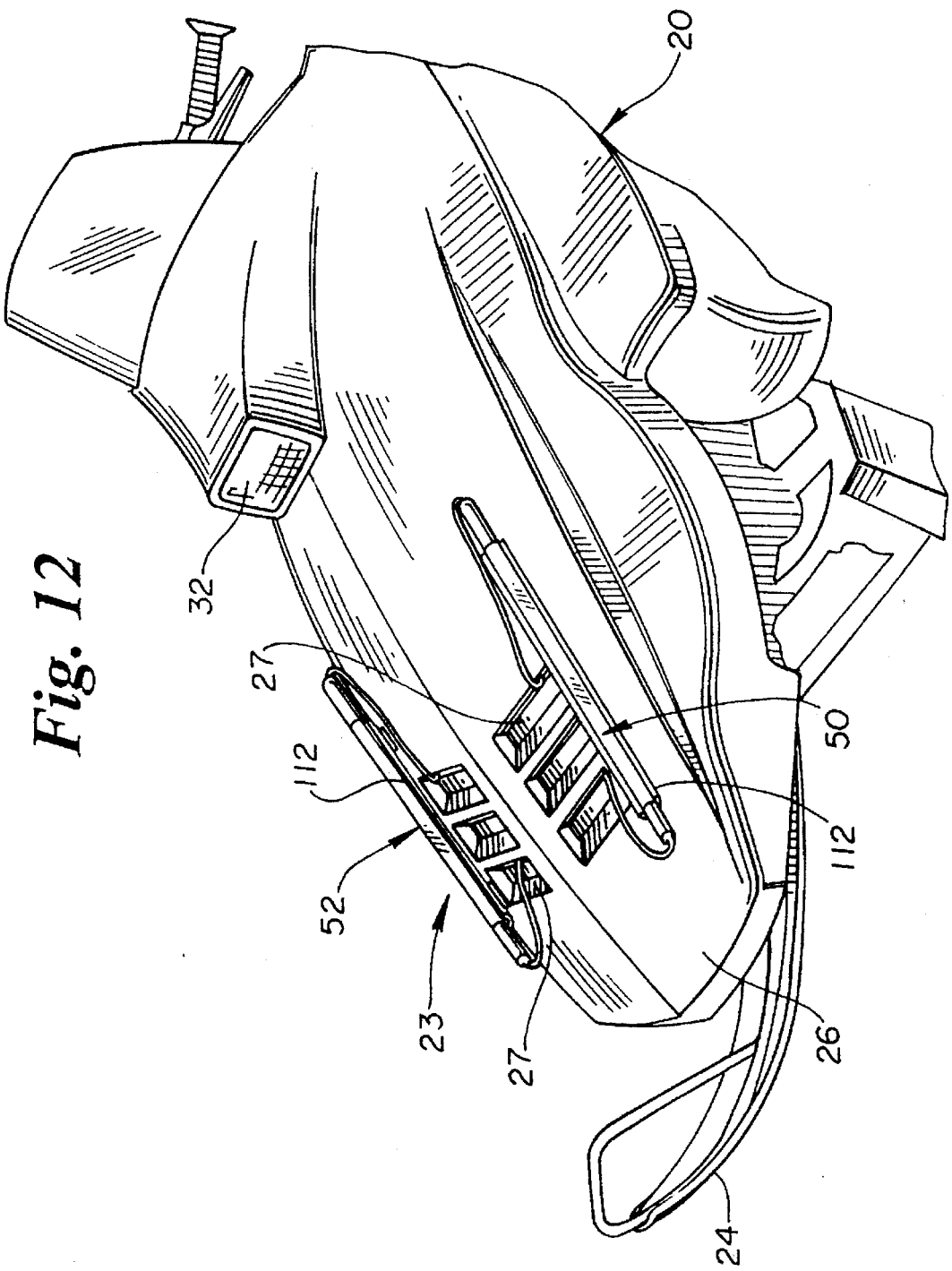
FIG. 12 is a perspective view of the alternative embodiment.
Figure 13:
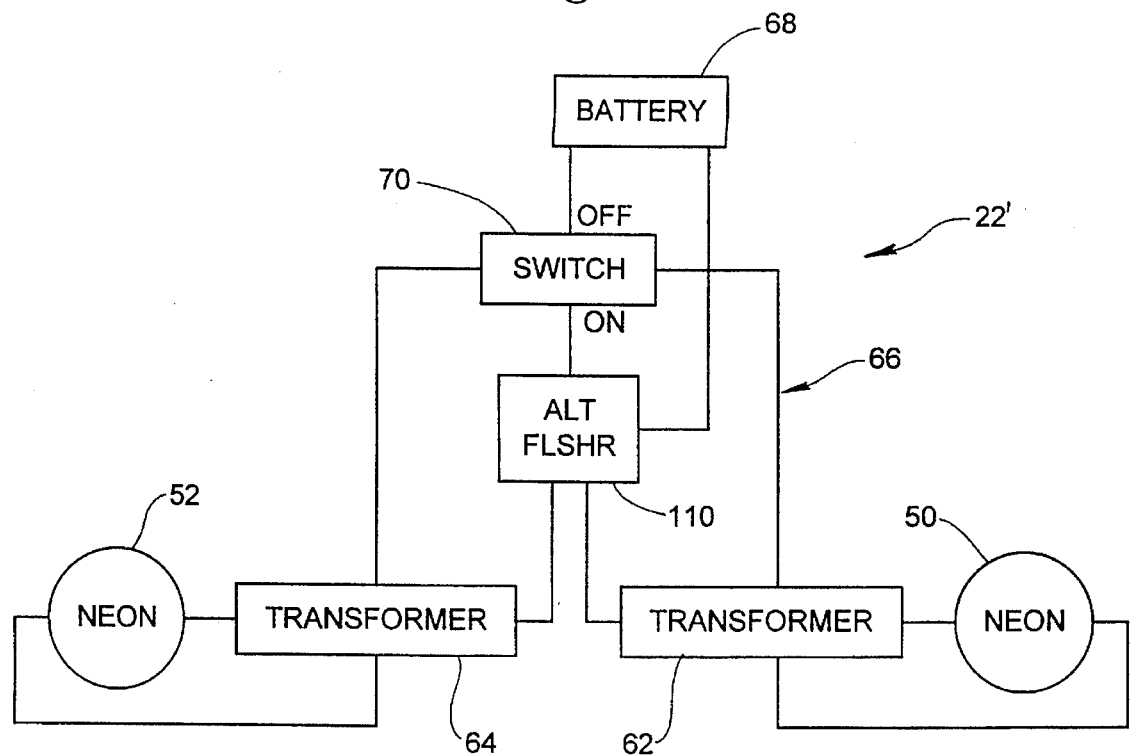
FIG. 13 is a circuit diagram depicting the components of the modified form of the present invention.

Referring to FIGS. 10–14, a second embodiment of the lighting system of the present invention is indicated generally at 23. FIG. 13 diagrammatically depicts a circuit which is substantially identical to that depicted in FIG. 6, and therefore commonly numbered, with the exception that it includes an alternating flasher 110. The flasher 110 is internally regulated and provides a 12-volt current to a 555 timer set-up, of a type available commercially through electronics shops, via resistors and diodes. The timer output turns internal transistors alternatively off and on by interrupting the group lead from the 12-volt transformers 62, 64, thereby causing the light elements to flash on and off alternatively.

Figure 14:
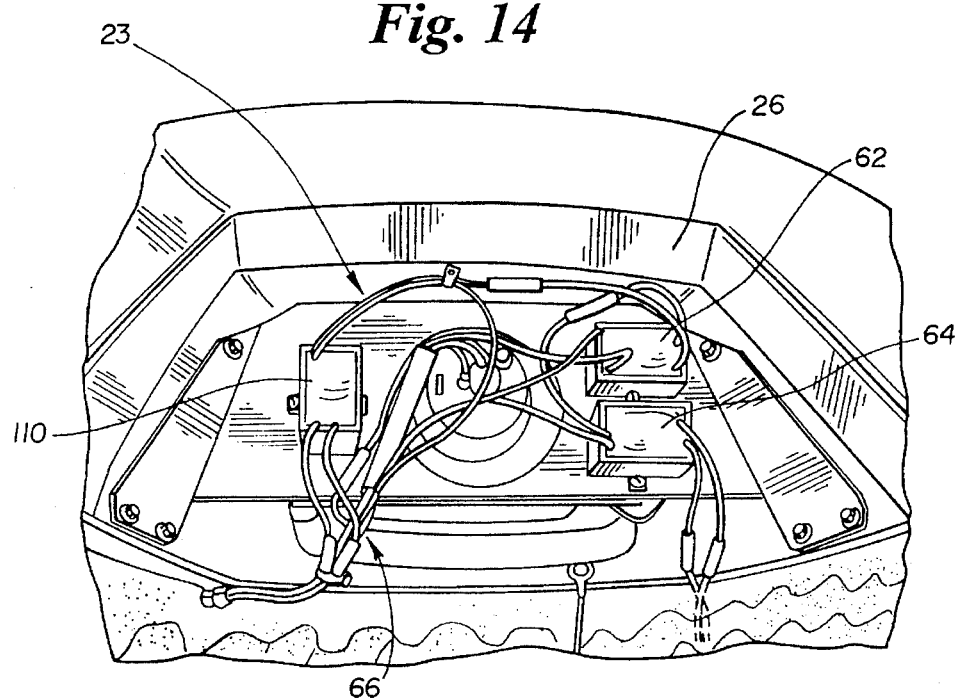
FIG. 14 is a rear elevational view depicting one arrangement of the components of the alternative embodiment of the present invention as they may be mounted on a snowmobile.

FIG. 14 depicts the wiring harness 66 and how the second embodiment lighting system 23, including the electronic components thereof, may be conveniently mounted under the cowl 26 of the snowmobile 20 so that the lighting elements 50, 52 may be disposed (as depicted in FIG. 12) on the exterior of the cowl 26 to be clearly visible from the front of the snowmobile 20.

In the flashing lighting system embodiment 23, the construction of the light elements 50, 52 is substantially identical to that depicted in FIG. 3; however, the light elements 50, 52 for use in the second embodiment lighting system 23 may be somewhat shorter in overall length than those used with the embodiment depicted in FIG. 1. Further, each of the elements 50, 52 for use with the second embodiment system 23 includes a generally trough-shaped, semi-circular reflector element 112. The reflector element 112 extends the length of the clear outer protective tube housings 54, 56, at least between the coated ends thereof. The lighting elements 50, 52 are attached directly to the reflectors 112 by suitable means such as a bead or spot of silicone-based adhesive 114. Alternatively, a reflective coating or paint-like material may be applied directly to the outer tubes 54, 56 or even to the inner lamp tubes 58, 60 as long as the light elements 50, 52 emit sufficient light.

Referring to FIG. 11, the second embodiment lighting system 23 includes mounting means for attaching light elements 50, 52 to the exterior surface of the snowmobile cowl 26. Four pad-like mounting structures 116 are provided with each light system 23. The mounting structures 116 comprise a base patch 118 and a removable portion 119. The base patch 118 has one adhesive coated side 120, the opposite side 122 being covered with one of the complementary hook or loop surfaces of a hook-and-loop type material such as VELCRO® or similar material. The removable portion 119 of the mounting means 116 has an adhesive side 128 and a hook or loop surface side 130 complementary to the hook or loop side 122 of the base patch 118. As shown in FIG. 11, the base patch 118 is permanently or semi-permanently attached to the exterior surface of the cowl 26, and the removable portion 119 is permanently, adhesively coupled to the back side of the reflector 112.

When installed, as shown in FIG. 12, it should be appreciated that the wiring harness 66 runs through vents 27 in the cowl 26 so the components of the system 23 can be mounted to suitable location inside the cowl 26 as shown in FIG. 14. Therefore, the lighting system 23 may be removed from one snowmobile 20 and conveniently remounted on another.

The preferred embodiment of the lighting system 22 of the present invention, including the alternative embodiments thereof, is available in kit form and comprises: two inert gas light elements; two transformers; one relay/rectifier pod; six mounting clamps for mounting the light elements; six mounting clamp bolts and nuts; two Scotch lock wire caps; two eyelet connectors; two butt connectors; six tie wraps; one battery wiring harness 66; and one off/on toggle switch and switch harness. The flashing, law enforcement lighting system embodiment 23 is substantially identical, but includes one flasher; the reflector means described above; and four adhesive mounts. Although four mounts are preferred, two longer single mounts, one for each light element 50, 52, could be used.

The electrical components of the present invention are suitably potted, epoxy encapsulated or otherwise appropriately substantially sealed to protect them from weather conditions and off-road use.

In use, with respect to the light elements 50, 52 of the lighting system embodiment 22 mounted as shown in FIGS. 1 and 4, there are at least three alternative mounting positions for the lighting system 22 relative to the snowmobile 20: (1) where the seat 36 meets the chassis 38 tunnel; (2) in the "L-bend" of the tunnel; and (3) under the running boards 40 (see FIG. 1). These locations are shown in phantom at 50', 52' in FIG. 4.

Mounting near the outer edge of the running boards is recommended for certain types of machines. Other snowmobiles may exhibit sufficient flexing at the outer edge of the running boards to make mounting the lighting system 22 there somewhat more difficult and one of the alternative locations should be used.

After choosing one of the four above mounting locations, the mounting clamp rings 90 are slipped over the lighting elements 50, 52 and suitable location is marked on the underside of the running boards 40 or chassis 38 to receive the mounting hardware (the above-listed nuts and bolts or other suitable means). The clamps 90 should be positioned to hold the lighting elements generally in the middle of the coated ends thereof. It is possible to use an extra clamp (not shown) in the middle of a lighting element 50, 52, particularly where the selected mounting position is where the seat 36 meets the chassis tunnel. Using a third clamp helps to keep the vehicle rider from kicking and damaging the lighting elements 50, 52 when mounting and dismounting.

After the lighting elements 50, 52 have been mounted, the end wire 79 closest to the back of the vehicle may be attached to the bolt holding the end clamp 90 in place to ground the system 22 as shown in FIG. 2. Next, the toggle switch 70 may be mounted in the dashboard area 34 of the snowmobile 20. The transformers 62, 64 are mounted using screws or by peeling off the release layer of an adhesive foam-type tape, which may be attached thereto or provided therewith, as is the case with all of the electrical components of the present invention. Generally the transformers 62, 64 should be mounted close to the front ends of the light elements 50, 52, but inside the cowl 26 to protect them from the elements. Once the transformers 62, 64 have been mounted, the high voltage wires of the wiring harness 66 from the transformers 62, 64 to the front of the lighting elements 50, 52 should be connected using the provided butt connectors. The toggle switch portion of the wiring harness 66 has two separate lines coming off, and these should be routed to the transformers 62, 64 and connected.

If the snowmobile 20 has a battery, the battery portion of the harness 66 should be located and the switch portion of the harness 66 connected thereto. If the snowmobile does not have a battery, the relay/rectifier pod 72 is required and should be mounted to the inside of the cowl area 26. After mounting, the relay/rectifier pod 72 should be connected to the switch harness or, on certain vehicles, to the voltage regulator 74 so that 12 volts alternating current is coupled to the relay/rectifier 72.

Wiring connector splices should be sealed with high quality electrical tape to ensure non-shorting connections. The provided tie wraps or tape should be used to keep all wiring away from hot and moving parts of the snowmobile 20. Caution should be taken to avoid contact with high voltage wires, and any high voltage wires running through any drilled holes should be have the holes deburred and/or silicone should be used over the holes to keep the wires from shorting. Once connected as described above, the toggle switch 70 can be activated and the pool of illumination cast will appear as represented in FIGS. 4 and 5. It should be appreciated that any embodiment of the lighting system of the present invention could be powered by an auxiliary battery, whereby it could function as a beacon in the event of engine failure.

With the exception of the adhesive and hook-and-loop mounts, the mounting of which should be understood from the FIG. 11, the installation of the flashing law enforcement second embodiment lighting system 23, particularly the wiring and component connection thereof, is substantially similar to the procedure outlined above.

The two forms or embodiments of the present invention depicted in FIGS. 1 and 10 are operationally similar and may be used together on a single snowmobile 20.

The lighting system 22 of the present invention may take different forms within the scope of the invention. In some embodiments it may be permanently mounted on either or both sides of a typical snowmobile; it may be mounted on vehicles other than snowmobiles, for example wheeled or tracked all-terrain vehicles for use on and off snow, amphibious vehicles, or on the fender wells or frame elements of motorcycles. It may also be adapted easily for use on cars and trucks for over-the-road use. The lighting elements 50, 52 may take configurations other than straight, for example curved or asymmetrically curved to conform to the surfaces of different vehicles.

It will be seen that a new and improved lighting system for off-road vehicles, particularly for snowmobiles and other such vehicles used by public officials or emergency workers, is provided. The present invention enables a cost effective, efficient method of enhancing the beauty and safety associated with off-road vehicles, particularly snowmobiles.

The present invention may be embodied in other forms without departing from the spirit or attributes thereof, and it is desired that the described embodiments be considered in all respects as illustrative and not restrictive, reference being made to the appended claims rather than to the description to indicate the scope of the invention.

What is claimed is:

1. A lighting system for off-road vehicles comprising:
   an inert gas discharge lamp;
   protecting means for protecting said lamp;
   mounting means for mounting the lighting system on said vehicle, said mounting means being operably coupled to said protecting means and comprising clamp means for releasably coupling said protecting means to an underside surface of said vehicle, whereby the lighting system is mounted on an underside surface of said vehicle; and
   wiring and control means for coupling said lamp to a power source and for controlling said lamp.

2. A lighting system for an off-road vehicle comprising:
   an inert gas discharge lamp;
   protecting means for protecting said lamp;
   mounting means for mounting the lighting system on said vehicle, said mounting means including a first member fixedly adhered to said vehicle and a second member fixedly adhered to said protecting means, the first and second members releasably coupled to each other.

3. A lighting system for snowmobiles comprising:
   two generally tubular inert gas light elements comprising an inner tube charged with an inert gas and an outer tube concentric with respect to the inner tube;
   two transformers;
   mounting means for mounting the light elements on the snowmobile;
   connecting means for operably connecting the light elements and transformers to a power source associated with the snowmobile; and vibration isolating means for isolating the light elements from vibrations produced by operating the snowmobile.

4. The lighting system according to claim 3 and flasher means for repeatably alternatively activating one and then the other of the light elements.

5. The lighting system according to claim 3 and reflector means for reflecting the light produced by the light elements.

6. A lighting system for a snowmobile, comprising:
   at least one light fixture mounted to the snowmobile, said light fixture comprising a generally tubular bulb filled with inert gas, a generally tubular protective tube containing said bulb, said protective tube having two opposed ends and a longitudinal axis, each of said ends carrying an end seal, and at least one vibration isolating member generally between said bulb and tube for separating said bulb and tube to prevent said bulb from contacting said tube; and
   wiring and control means for coupling said at least one light fixture to a power source associated with the snowmobile and for controlling said light fixture.

7. The lighting system according to claim 6, wherein said system comprises at least two of said light fixtures and wherein said wiring and control means includes two transformers, one of said transformers operably coupled to one of said light fixtures and the other transformer operably coupled to the other light fixture.

8. The lighting system according to claim 7, wherein each transformer has a single high voltage output and wherein each light fixture is grounded to the snowmobile.

9. The lighting system according to claim 8, wherein a reflector is attached to each protective tube for reflecting light away from said light fixture.

10. The lighting system according to claim 9, further comprising a rectifier operably coupled into said lighting system for rectifying the power produced by said power source.

11. The lighting system according to claim 10, further comprising a flasher operably coupled into said lighting system for repeatedly, temporarily and alternatively activating said light fixtures.

* * * * *